(12) United States Patent
Vitt et al.

(10) Patent No.: US 12,326,118 B2
(45) Date of Patent: Jun. 10, 2025

(54) GAS TURBINE ENGINES WITH A FUEL CELL ASSEMBLY

(71) Applicants: General Electric Company, Schenectady, NY (US); GE Avio S.r.l., Rivalta di Torino (IT)

(72) Inventors: Paul Hadley Vitt, Liberty Township, OH (US); Matteo Renato Usseglio, Turin (IT); Brian Lewis Devendorf, Georgetown, MA (US)

(73) Assignees: General Electric Company, Evendale, OH (US); GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 17/946,499

(22) Filed: Sep. 16, 2022

(65) Prior Publication Data
US 2024/0093644 A1 Mar. 21, 2024

(51) Int. Cl.
*F02C 7/22* (2006.01)
*B64D 41/00* (2006.01)
*F02C 6/00* (2006.01)
*F02C 6/10* (2006.01)
*F02K 3/072* (2006.01)

(52) U.S. Cl.
CPC ............... *F02C 7/22* (2013.01); *F02C 6/00* (2013.01); *F02C 6/10* (2013.01); *B64D 2041/005* (2013.01); *F02K 3/072* (2013.01)

(58) Field of Classification Search
CPC .... F02C 3/10; F02C 3/067; F02C 6/04; F02C 6/10; F02C 6/18; F02C 7/22; F02C 7/08; F02C 7/10; F02C 7/224; F02K 3/04; F02K 3/06; B64D 2041/005; H01M 8/04111

See application file for complete search history.

(56) References Cited

U.S. PATENT DOCUMENTS

| 3,135,496 | A | | 6/1964 | Scheper, Jr. | |
|---|---|---|---|---|---|
| 4,502,837 | A | | 3/1985 | Blair et al. | |
| 4,845,939 | A | * | 7/1989 | Jordan | F02C 6/08 60/226.3 |
| 4,909,031 | A | * | 3/1990 | Grieb | F02K 7/16 60/225 |

(Continued)

FOREIGN PATENT DOCUMENTS

| CN | 114934843 A | * | 8/2022 | ............... F02C 6/00 |
|---|---|---|---|---|
| EP | 3124794 A1 | | 2/2017 | |

*Primary Examiner* — Alain Chau
(74) *Attorney, Agent, or Firm* — Dority & Manning, P.A.

(57) ABSTRACT

An aircraft engine is provided. The aircraft engine includes a compressor section having a compressor. A turbine section is downstream of the compressor section. The turbine section includes a turbine having turbine blades arranged in counter rotating stages. The aircraft engine further includes one or more fluid supply lines and a fuel cell assembly fluidly coupled to the one or more fluid supply lines for receiving one or more input fluids. The fuel cell assembly is in fluid communication with the turbine section to provide one or more output products to the turbine section. The aircraft engine further includes a heat exchanger in fluid communication with the turbine downstream of the counter rotating stages of turbine blades to receive exhaust gases from the turbine. The heat exchanger is thermally coupled to the one or more fluid supply lines of the fuel cell assembly.

20 Claims, 8 Drawing Sheets

(56) References Cited

U.S. PATENT DOCUMENTS

| | | |
|---|---|---|
| 4,981,414 A | 1/1991 | Sheets |
| 5,010,729 A * | 4/1991 | Adamson ................ F02K 3/072 |
| | | 416/129 |
| 5,152,661 A | 10/1992 | Sheets |
| 5,209,644 A | 5/1993 | Dorman |
| 5,352,092 A | 10/1994 | Ferleger et al. |
| 5,413,879 A * | 5/1995 | Domeracki ....... H01M 8/04007 |
| | | 429/495 |
| 5,616,004 A | 4/1997 | Alizadeh |
| 5,779,443 A | 7/1998 | Haller et al. |
| 5,968,680 A * | 10/1999 | Wolfe ................ H01M 8/04111 |
| | | 429/495 |
| 6,375,419 B1 | 4/2002 | LeJambre et al. |
| 6,709,239 B2 | 3/2004 | Chandraker |
| 6,799,948 B2 | 10/2004 | Ito et al. |
| 6,802,474 B2 | 10/2004 | Sonoda et al. |
| 7,175,393 B2 | 2/2007 | Chandraker |
| 7,179,058 B2 | 2/2007 | Chandraker |
| 7,204,676 B2 | 4/2007 | Dutton et al. |
| 7,374,403 B2 | 5/2008 | Decker et al. |
| 7,380,749 B2 * | 6/2008 | Fucke ................ H01M 8/04111 |
| | | 429/513 |
| 7,416,382 B2 | 8/2008 | Guemmer |
| 7,419,353 B2 | 9/2008 | Guemmer |
| 7,451,592 B2 | 11/2008 | Taylor et al. |
| 7,578,136 B2 | 8/2009 | Derouineau et al. |
| 7,966,830 B2 * | 6/2011 | Daggett ................ B64D 27/02 |
| | | 60/780 |
| 7,967,571 B2 | 6/2011 | Wood et al. |
| 8,016,228 B2 * | 9/2011 | Fucke ................... B64D 41/00 |
| | | 244/58 |
| 8,157,518 B2 | 4/2012 | Decker et al. |
| 8,292,570 B2 | 10/2012 | Suciu et al. |
| 8,292,574 B2 | 10/2012 | Wood et al. |
| 8,337,154 B2 | 12/2012 | Decker et al. |
| 8,439,646 B2 | 5/2013 | Guemmer |
| 8,468,826 B2 | 6/2013 | Kares et al. |
| 8,517,677 B2 | 8/2013 | Wood et al. |
| 8,573,946 B2 | 11/2013 | Power et al. |
| 8,678,757 B2 | 3/2014 | Li |
| 8,864,457 B2 | 10/2014 | Malandra et al. |
| 9,046,111 B2 | 6/2015 | Harvey et al. |
| 9,080,512 B2 | 7/2015 | Suciu et al. |
| 9,200,518 B2 | 12/2015 | Kares |
| 9,604,730 B2 * | 3/2017 | Hagh ...................... A62C 3/08 |
| 9,731,834 B2 * | 8/2017 | Hagh ..................... B64D 41/00 |
| 9,777,578 B2 | 10/2017 | Yokoyama et al. |
| 9,790,796 B2 | 10/2017 | Stampfli et al. |
| 9,797,267 B2 | 10/2017 | Lohaus et al. |
| 10,233,761 B2 | 3/2019 | Snider et al. |
| 10,577,956 B2 | 3/2020 | Northall et al. |
| 10,697,471 B2 | 6/2020 | Northall et al. |
| 10,724,432 B2 * | 7/2020 | Shapiro ............ H01M 8/2428 |
| 10,814,992 B2 | 10/2020 | Halsey et al. |
| 11,015,449 B2 | 5/2021 | Koda et al. |
| 11,053,019 B2 | 7/2021 | Mackin |
| 11,085,309 B2 | 8/2021 | Mondal et al. |
| 11,149,549 B2 | 10/2021 | Koda |
| 11,371,379 B2 * | 6/2022 | van Der Merwe .. H02K 7/1823 |
| 11,391,211 B2 * | 7/2022 | Smith ..................... F02C 7/224 |
| 11,815,030 B1 * | 11/2023 | Owoeye ................ F02C 7/141 |
| 12,071,889 B2 * | 8/2024 | Vitt ........................ F02C 3/107 |
| 2004/0040312 A1 * | 3/2004 | Hoffjann ........... H01M 8/04089 |
| | | 60/784 |
| 2006/0029849 A1 * | 2/2006 | Metzler ............. H01M 8/04164 |
| | | 429/414 |
| 2006/0071477 A1 * | 4/2006 | Yang ........................ F02C 1/04 |
| | | 290/52 |
| 2007/0053779 A1 | 3/2007 | Guemmer |
| 2008/0131272 A1 | 6/2008 | Wood et al. |
| 2008/0149205 A1 | 6/2008 | Gupta et al. |
| 2009/0123276 A1 | 5/2009 | Greim et al. |
| 2010/0031669 A1 * | 2/2010 | Ensign ...................... F02C 3/10 |
| | | 415/148 |
| 2010/0212857 A1 * | 8/2010 | Bulin ..................... F02C 7/224 |
| | | 165/41 |
| 2011/0045370 A1 * | 2/2011 | Westenberger ........ B64D 41/00 |
| | | 244/58 |
| 2011/0129346 A1 | 6/2011 | Jarrah et al. |
| 2012/0083387 A1 * | 4/2012 | Turner ................... B60L 58/30 |
| | | 180/65.265 |
| 2012/0153076 A1 * | 6/2012 | Burns .................... B64D 41/00 |
| | | 60/785 |
| 2012/0237344 A1 | 9/2012 | Wood et al. |
| 2013/0089415 A1 | 4/2013 | Brown et al. |
| 2014/0023945 A1 * | 1/2014 | Epstein .................. B64D 37/30 |
| | | 429/513 |
| 2014/0133982 A1 | 5/2014 | Dejeu et al. |
| 2014/0234095 A1 | 8/2014 | Auchoybur |
| 2015/0284070 A1 | 10/2015 | Breeze-Stringfellow et al. |
| 2015/0315974 A1 * | 11/2015 | Suciu ..................... F01D 13/006 |
| | | 415/62 |
| 2015/0353201 A1 * | 12/2015 | Hagh ....................... A62C 3/08 |
| | | 244/135 R |
| 2016/0052621 A1 | 2/2016 | Ireland et al. |
| 2016/0177723 A1 | 6/2016 | Lohaus et al. |
| 2017/0158343 A1 * | 6/2017 | Hagh ................ H01M 8/04111 |
| 2018/0112547 A1 | 4/2018 | Snider et al. |
| 2018/0363554 A1 | 12/2018 | Kroger et al. |
| 2019/0048724 A1 | 2/2019 | Tweedt |
| 2019/0085715 A1 * | 3/2019 | van Der Merwe ....... F01D 1/24 |
| 2019/0136761 A1 * | 5/2019 | Shapiro ............. H01M 8/04201 |
| 2019/0301286 A1 | 10/2019 | Spangler et al. |
| 2020/0165974 A1 * | 5/2020 | Smith ....................... F02C 7/18 |
| 2020/0194799 A1 | 6/2020 | Hart et al. |
| 2020/0313207 A1 * | 10/2020 | Milcarek ........... H01M 8/04022 |
| 2021/0087940 A1 | 3/2021 | Clark et al. |
| 2021/0189883 A1 | 6/2021 | Koda |
| 2021/0222617 A1 * | 7/2021 | Stieger .................... F02C 3/103 |
| 2021/0270137 A1 | 9/2021 | Sozio et al. |
| 2023/0016094 A1 * | 1/2023 | Milcarek ........... H01M 8/04022 |
| 2023/0039759 A1 * | 2/2023 | Wang ................. H01M 8/04111 |
| 2023/0340906 A1 * | 10/2023 | Vitt ......................... F02C 3/067 |

* cited by examiner

GAS TURBINE ENGINES WITH A FUEL CELL ASSEMBLY

FIELD

The present disclosure is generally related to gas turbine engines having fuel cell assemblies operable therewith.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor and mixed with fuel and ignited in the combustion section for generating combustion gases which flow downstream through the turbine section. The turbine section extracts energy therefrom for rotating the compressor section and fan assembly to power the gas turbine engine and propel an aircraft incorporating such a gas turbine engine in flight.

At least certain gas turbine engines include a fuel cell assembly operable therewith.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the term "line" may include a hose, pipe, or other fluid conduit that carries a fluid.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to gas turbine engines having fuel cell assemblies operable therewith. Particularly, the present disclosure is related to heating one of more fluids supplied to the fuel cell assembly to increase the overall efficiency of the fuel cell assembly and the gas turbine engine. For example, fuel cell assemblies may rely on recuperation of heat from the turbine exhaust gas to heat the fuel and air prior to use in the fuel cell. This may be done via a large heat exchanger thermally coupled to the exhaust gases. However, such heat exchangers may require low Mach numbers in order to meet other mechanical limitations of the heat exchanger. As such, the present disclosure includes a turbine section having turbine blades arranged in counter rotating stages. The counter rotating stages do not have a turbine vane disposed therebetween, which advantageously results in a large reduction in the Mach number across the counter rotating stages. This reduction in the Mach number allows for a large heat exchanger to thermally couple to the exhaust gases downstream of the counter rotating stages, thereby allowing for a large heat extraction from the exhaust gases, which increases the efficiency of the heat exchanger and the gas turbine engine. Particularly, the reduction in the Mach number across the counter rotating stages allows for a large heat exchanger to be employed in the flowpath without causing blockage issues, which results in higher efficiency heat extraction and higher efficiency gas turbine engine operation.

Figure 1:
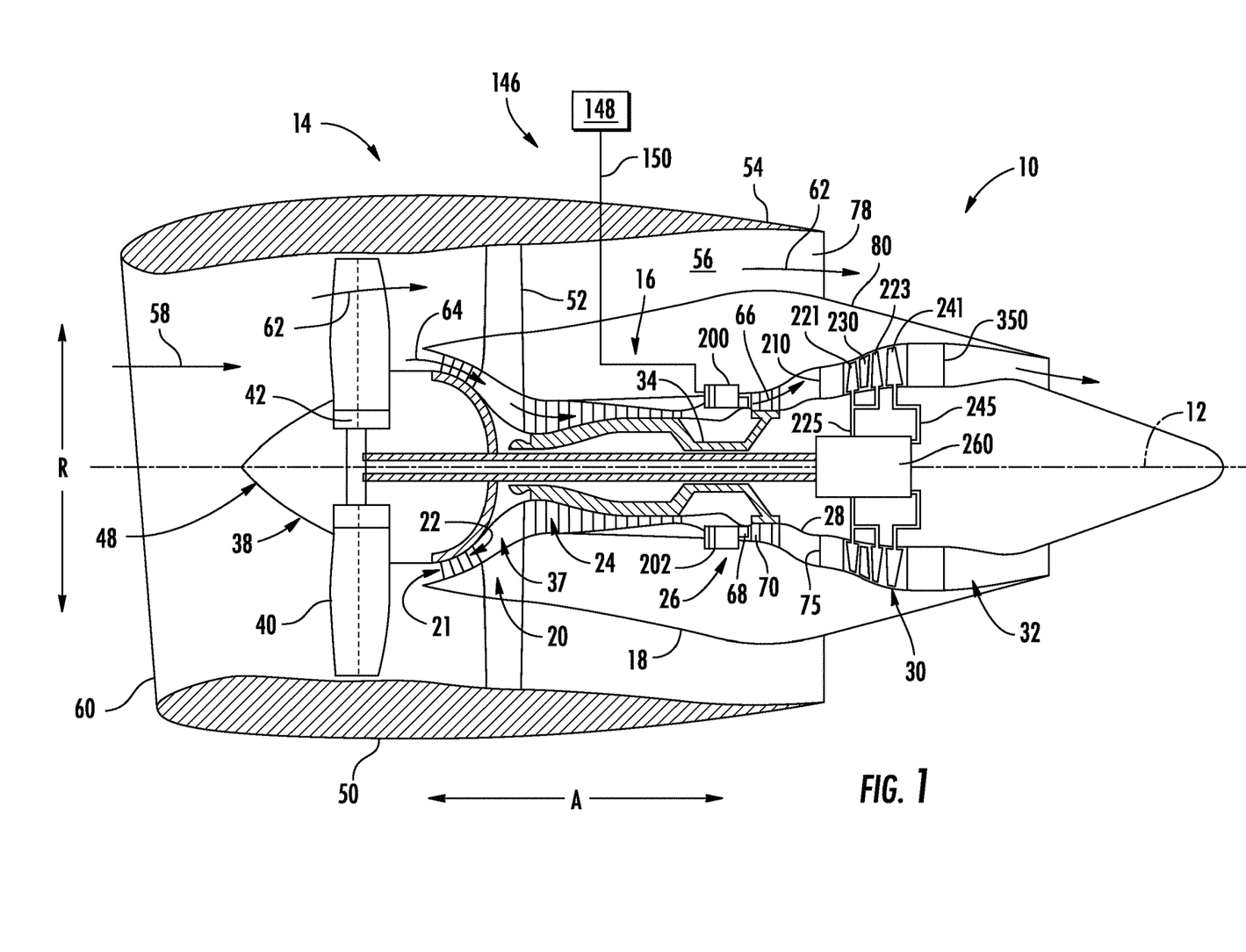
FIG. 1 is a cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "gas turbine engine 10." As shown in FIG. 1, the gas turbine engine 10 defines an axial direction A (extending parallel to a longitudinal centerline 12 provided for reference), a radial direction R, and a circumferential direction (i.e., a direction extending about the axial direction A; not depicted). In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 21. The outer casing 18 encases, in serial flow relationship, a compressor section 20 including a booster or low pressure (LP) compressor 22 and a high pressure (HP) compressor 24, a combustion section 26, a turbine section including a high pressure (HP) turbine 28 and a low pressure (LP) turbine 30, and an exhaust section 32. The compressor section, the combustion section 26, and the turbine section together define a core flowpath 37 extending from the annular inlet 21 through the LP compressor 22, the HP compressor 24, the combustion section 26, the HP turbine 28, the LP turbine 30 and the exhaust section 32. The core flowpath may generally be bound by the engine frame, engine shaft, engine liner, or other components. A high pressure (HP) shaft or a spool 34 drivingly connects the HP turbine 28 to the HP compressor 24. A low pressure (LP) shaft or a spool 36 drivingly connects the LP turbine 30 to the LP compressor 22.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. The fan blades 40 and disk 42 are together rotatable about the longitudinal centerline 12 by the LP shaft or the spool 36.

Referring still to the exemplary embodiment of FIG. 1, the disk 42 is covered by a rotatable spinner cone 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. For the embodiment depicted, the outer nacelle 50 is supported relative to the turbomachine 16 by a plurality of circumferentially-spaced outlet guide vanes 52. Moreover, a downstream section 54 of the outer nacelle 50 extends over an outer portion of turbomachine 16 so as to define a bypass airflow passage 56 therebetween.

During operation of the gas turbine engine 10, a volume of air 58 enters the gas turbine engine 10 through an associated inlet 60 of the outer nacelle 50 and/or the fan section 14. As the volume of air 58 passes across the fan blades 40, a first portion of air 62 from the volume of air 58 is directed or routed into the bypass airflow passage 56 and a second portion of air 64 from the volume of air 58 is directed or routed into the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to an inner casing (not shown) and HP turbine rotor blades 70 that are coupled to the HP shaft or spool 34, thus causing the HP shaft or spool 34 to rotate, thereby supporting operation of the HP compressor 24.

The combustion gases 66 are then routed through the LP turbine 30 where a second portion of thermal and kinetic energy is extracted from the combustion gases 66 via first stage rotor blades 221 and second stage rotor blades 223 that rotate together in a first direction around the longitudinal centerline 12, and final stage rotor blades 241 that rotate in a second direction around the longitudinal centerline 12 opposite the first direction. First turbine guide vanes 210 are disposed upstream of the first stage rotor blades 221, and second turbine guide vanes 230 are disposed between the first stage rotor blades 221 and the second stage rotor blades 223. The first stage rotor blades 221 and the second stage rotor blades 223 are connected via a first spool 225 that rotates in the first direction around the longitudinal centerline 12 and is coupled to a gearbox 260. The final stage rotor blades 241 are connected to a second spool 245 that rotates in the second direction and is also coupled to the gearbox 260. The gearbox 260 is further coupled to the LP shaft or spool 36, such that the first stage rotor blades 221, the second stage rotor blades 223, and the final stage rotor blades 241 drive the LP shaft or spool 36 to rotate through the gearbox 260. Thus, the LP turbine 30 supports operation of the LP compressor 22 and/or rotation of the fan 38.

The combustion gases 66 are subsequently routed through the exhaust section 32 of the turbomachine 16 to provide propulsive thrust. The exhaust section 32 includes a heat exchanger 350 disposed immediately downstream of the final stage rotor blades 241.

Simultaneously, the pressure of the first portion of air 62 is substantially increased as the first portion of air 62 is routed through the bypass airflow passage 56 before it is exhausted from a fan nozzle exhaust section 78 of the gas turbine engine 10, also providing propulsive thrust. The HP turbine 28, the LP turbine 30, and the exhaust section 32 at least partially define a hot gas path for routing the combustion gases 66 through the turbomachine 16.

Referring still to FIG. 1, the gas turbine engine 10 additionally includes a fuel delivery system 146. The fuel delivery system 146 generally includes a fuel source 148, such as a fuel tank, and one or more fuel delivery lines 150. The one or more fuel delivery lines 150 provide a fuel flow through the fuel delivery system 146 to the combustion section 26 of the turbomachine of the gas turbine engine 10. The combustion section 26 includes an integrated fuel cell and combustor assembly 200. The one or more fuel delivery lines 150, for the embodiment depicted, provide a flow of fuel to the integrated fuel cell and combustor assembly 200.

The exemplary gas turbine engine 10 depicted in FIG. 1 is by way of example only, and in other exemplary embodiments, the gas turbine engine 10 may have any other suitable configuration. For example, in other exemplary embodiments, the gas turbine engine 10 may instead be configured as any other suitable turbomachine including, e.g., any other suitable number of shafts or spools, and excluding, e.g., the fan 38 and/or including, e.g., a gearbox between the fan 38 and the LP shaft or spool 36, a variable pitch fan 38, etc.

Accordingly, in other exemplary embodiments, the gas turbine engine 10 may instead be configured as, e.g., a turbojet engine, a turboshaft engine, a turboprop engine, etc., and further may be configured as an aeroderivative gas turbine engine or an industrial gas turbine engine.

Figure 2:
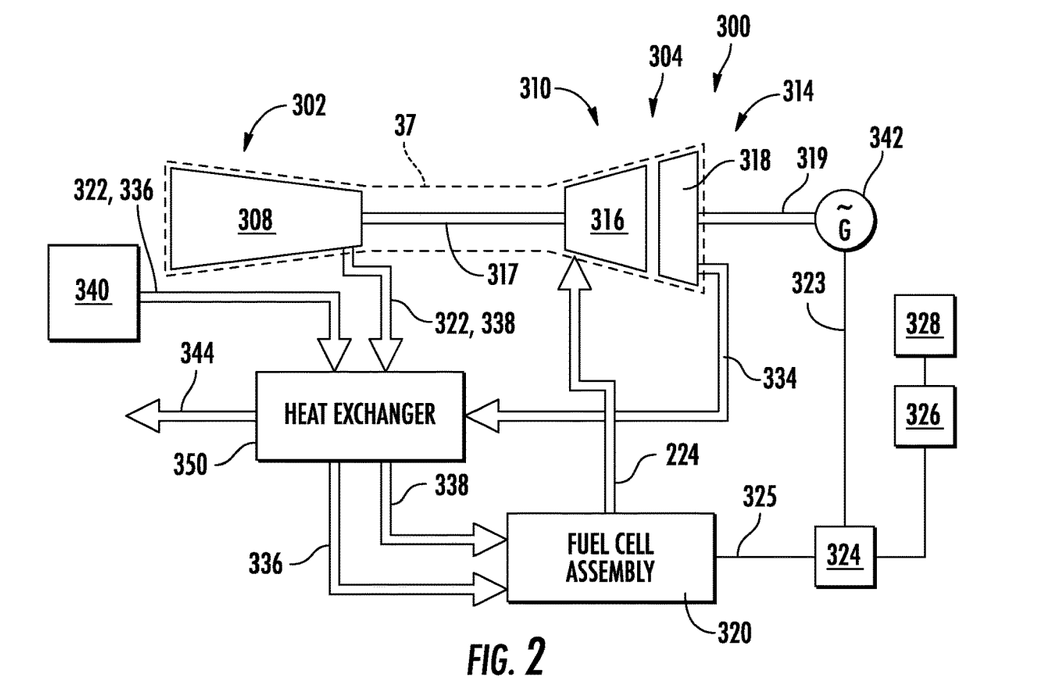
FIG. 2 is simplified schematic view of a gas turbine engine in accordance with an embodiment of the present disclosure.

Referring now to FIG. 2, a simplified schematic view of a gas turbine engine 300 in accordance with an exemplary aspect of the present disclosure is provided. The exemplary gas turbine engine 300 depicted in FIG. 2 may be configured in substantially the same manner as exemplary gas turbine engine 10 described above with reference to FIG. 1.

For example, as is shown, the gas turbine engine 300 generally includes a compressor section 302 and a turbine section 304 arranged in a serial flow order and coupled to one another via one or more shafts. In some embodiments, the compressor section 302 may include a compressor 308, and the turbine section 304 may include a turbine 310. For example, in some embodiments, the compressor section 302 may include a low pressure compressor and a high pressure compressor (such as the LP compressor 22 and the HP compressor 24 shown in FIG. 1). Similarly, in such embodiments, the turbine section 304 may include a LP turbine and an HP turbine (such as the LP turbine 30 and the HP turbine 28 shown in FIG. 1).

In exemplary embodiments, as shown in FIG. 2, the turbine 310 may include turbine blades arranged in counter rotating stages 314. In some embodiments, the turbine 310 may be a low pressure turbine. The counter rotating stages 314 may include a first-direction turbine stage 316 that rotates in a first direction at a first speed. Additionally, the counter rotating stages 314 may include a second-direction turbine stage 318 positioned downstream of the first-direction turbine stage 316 that rotates in a second direction opposite the first direction at a second speed. In many embodiments, the second speed may be lower than the first speed. For example, the first-direction turbine stage 316 may rotate in one of a clockwise direction or a counterclockwise direction, and the second-direction turbine stage 318 may rotate in the other of the clockwise direction or the counterclockwise direction. As will be appreciated, the counter rotating stages 314 of turbine blades may advantageously expand the turbine working fluid to a larger annulus, thereby lowering the Mach number. Reduction in the Mach number of the turbine working fluid may allow for additional thermal energy to be extracted, thereby increasing the efficiency of the heat exchanger 350. Additionally, the counter rotating stages 314 may advantageously reduce the overall size of the aircraft engine by eliminating the need for a large diffuser section. In this way, the gas turbine engine 300 described herein may be more axially compact than prior designs.

As shown in FIG. 2, the first-direction turbine stage 316 may be coupled to a first shaft or a high speed shaft 317, such that the first-direction turbine stage 316 and the first shaft 317 rotate together in the first direction. Similarly, the second-direction turbine stage 318 may be coupled to a second shaft or low speed shaft 319, such that the second-direction turbine stage 318 and the second shaft 319 rotate together in the second direction. The first shaft 317 and the second shaft 319 are not coupled to one another. In various embodiments, the second shaft 319 may be coupled to a generator 342, such that the generator 342 may convert the rotational energy of the second shaft 319 into electrical energy. In many embodiments, the compressor 308 may be coupled to the high speed shaft 317, such that the first-direction turbine stage 316 powers the compressor 308.

In exemplary embodiments, a recuperator or heat exchanger 350 may receive exhaust gases from the turbine 310 downstream of the counter rotating stages 314 of turbine blades. For example, in some embodiments, the heat exchanger 350 may be disposed in the core flowpath 37 downstream (e.g., immediately downstream) of the counter rotating stages 314. Alternatively, the heat exchanger 350 may be in fluid communication with the turbine 310 via an exhaust collection duct 334 (such that the heat exchanger 350 is positioned outside of the core flowpath 37). For example, the exhaust collection duct 334 may extend from the turbine 310 to the heat exchanger 350. Particularly, the exhaust collection duct 334 may extend from the turbine 310 downstream of the second-direction turbine stage 318 to the heat exchanger 350, such that the exhaust collection duct 334 receives exhaust gases from downstream of the counter rotating stages 314. Pulling exhaust gases from downstream of the second-direction turbine stage 318 is advantageous because the exhaust gases in this location have a reduced Mach number from having passes through the counter rotating stages 314, and as such, the exhaust gases may be used in the heat exchanger 350. Additionally, positioning the heat exchanger 350 outside of the core flowpath 37 may advantageously reduce duct losses within the core flowpath 37.

In many embodiments, the gas turbine engine 300 may further include a fuel cell assembly 320 fluidly coupled to one or more fluid supply lines 322 for receiving one or more input fluids. The fuel cell assembly 320 may provide one or more output products 224 to the turbine section 304. For example, the one or more output products 224 may be provided directly to the turbine section 304 as a working fluid for expansion in the turbine 310 of the turbine section 304. Alternatively, or additionally, the output products 224 may be combusted (e.g., via an igniter) prior to entrance into the turbine section 304. In exemplary embodiments, the fuel cell assembly 320 may be configured as a solid oxide fuel cell ("SOFC") assembly that includes a cathode, an anode, and an electrolyte. As will be appreciated, a SOFC is generally an electrochemical conversion device that produces electricity directly from oxidizing a fuel. Generally, fuel cell assemblies, and in particular fuel cells, are characterized by the electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

In many embodiments, the fluid supply lines 322 may include a fuel supply line 336 and an air supply line 338. The fuel supply line 336 may extend from a fuel supply 340 to the fuel cell assembly 320. The fuel supply 340 may be a container, tank, or other supply of fuel. The fuel supply line 336 may provide a fuel to the fuel cell assembly 320, e.g., the fuel may be provided to the anode side of the fuel cell assembly 320. The air supply line 338 may extend from the compressor 308 of the compressor section 302 to the fuel cell assembly 320. The air supply line 338 may be a bleed air line from the compressor 308, such that the air supply line 338 provides a portion of compressed air from the compressor to the fuel cell assembly. In many embodiments, air may be provided to the cathode side of the fuel cell assembly 320.

In exemplary implementations, the fuel cell assembly 320 converts the fuel received by the fuel supply line 336 to the anode and the air received by the air supply line 338 to the cathode into electrical energy. For example, a fuel cell power output 325 may be generated by the fuel cell assembly 320 in the form of DC current. This fuel cell power output 325 may be directed to a power converter 324 in order to change the DC current into AC current that can be effectively utilized by one or more subsystems. In particular, for the embodiment depicted, the electrical power is provided from the power converter 324 to an electric bus 326. The electric bus 326 may be an electric bus dedicated to the gas turbine engine 10, an electric bus of an aircraft incorporating the gas turbine engine 10, or a combination thereof. The electric bus 326 is in electric communication with one or more additional electrical devices 328, which may be a power source, a power sink, or both. For example, the additional electrical devices 328 may be a power storage device (such as one or more batteries), an electric machine (an electric generator, an electric motor, or both), an electric propulsion device, etc. In many implementations, the generator 342 may produce a generator power output 323, which may be provided to the power converter 324 (or alternatively, directly to the electric bus 326) for use with the one or more additional electrical devices 328.

Preheating the air and the fuel supplied to the fuel cell assembly 320 may advantageously increase the efficiency of the fuel cell assembly 320. As such, as shown in FIG. 2, the heat exchanger 350 may be thermally coupled to the one or more fluid supply lines 322 of the fuel cell assembly 320. For example, the heat exchanger 350 may be separately fluidly coupled to each of the fuel supply line 336, the air supply line 338, and the exhaust collection duct 334, to transfer heat from the exhaust gases in the exhaust collection duct 334, the air in the air supply line 338, and the fuel in the fuel supply line 336. In this way, the heat exchanger 350 may be a three-fluid heat exchanger capable of transferring heat between the air, fuel, and exhaust gases. Spent exhaust gases 344 (i.e., exhaust gases having traveled through the heat exchanger 350) may be exhausted to the atmosphere.

Figure 3:
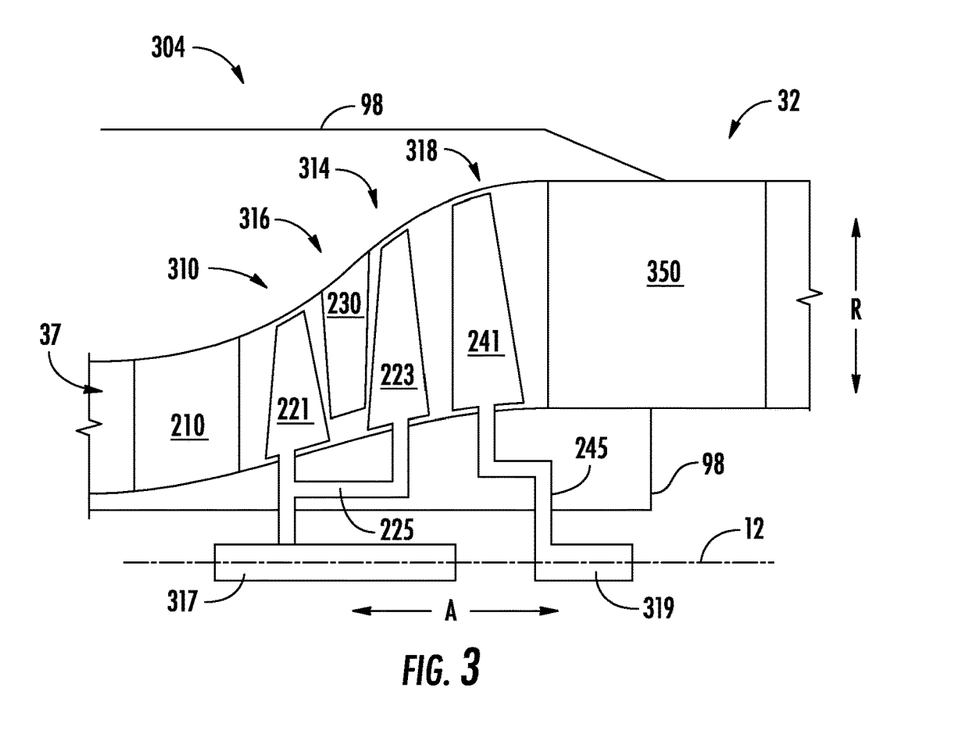
FIG. 3 is a schematic view of a portion of a turbine section and an exhaust section of a gas turbine engine according to an exemplary aspect of the present disclosure.

FIG. 3 is a schematic view of a portion of a turbine section 304 and an exhaust section 32 of a gas turbine engine according to one or more embodiments. More specifically, FIG. 3 shows a turbine 310 and a heat exchanger 350 disposed downstream of the turbine 310 within the exhaust section 32 according to one or more embodiments. In particular embodiments, the turbine 310 may be an LP turbine 30 having the configuration shown in FIG. 1. The turbine section 304 is generally configured as part of a gas turbine engine defining a radial direction R and an axial direction A.

The turbine 310 includes counter rotating stages 314, which include a first-direction turbine stage 316 and a second-direction turbine stage 318. The first-direction turbine stage 316 may include the first stage rotor blade 221 and the second stage rotor blades 223. The second-direction turbine stage 318 may include the final stage rotor blades 241. More particularly, the turbine 310 may include, in serial flow order and along the axial direction A, first turbine guide vanes 210, first stage rotor blades 221, second turbine guide vanes 230, second stage rotor blades 223, and final stage rotor blades 241. The exhaust section 32 according to one or more embodiments is disposed downstream of the turbine 310 in the axial direction A and includes the heat exchanger 350 also downstream of the final stage rotor blades 241 in the axial direction A.

The turbine 310 may form part of the core flowpath 37 of the gas turbine engine 10 (e.g., defined collectively by the compressor section, the combustion section, the turbine section, and the exhaust section). In many embodiments, as shown in FIG. 3, the heat exchanger 350 may be disposed in the core flowpath 37. In other embodiments, as shown in FIG. 2, the heat exchanger 350 may be disposed outside of the core flowpath 37. According to one or more embodiments, the heat exchanger 350 is a frame-integrated heat exchanger that is integrated into a frame 98 of the turbomachine 16. According to one or more embodiments, the heat exchanger 350 is a heat exchanger formed separately from the frame 98 of the turbomachine 16.

According to one or more embodiments, the first turbine guide vanes 210 are directly upstream of the first stage rotor blades 221, the first stage rotor blades 221 are directly upstream of the second turbine guide vanes 230, the second turbine guide vanes 230 are directly upstream of the second stage rotor blades 223, and the second stage rotor blades 223 are directly upstream of the final stage rotor blades 241, and the final stage rotor blades 241 are directly upstream of the heat exchanger 350. According to one or more embodiments, the first turbine guide vanes 210 and the second turbine guide vanes 230 are stationary.

While FIGS. 1 and 3 show two stages of turbine rotor blades 221, 223 with a single stage of turbine guide vanes 230, therebetween and upstream of the final stage rotor blades 241, one or more embodiments may include additional stages of turbine rotor blades and turbine guide vanes. For example, the turbine 310 may further include third turbine guide vanes and third stage rotor blades in serial order downstream of the second stage rotor blades 223 and may further include fourth turbine guide vanes and fourth stage rotor blades in serial order downstream of the third stage rotor blades, and so on.

The first-direction turbine stage 316, which includes the first stage rotor blades 221 and the second stage rotor blades 223, may rotate in a first direction around the longitudinal centerline 12. The first stage rotor blades 221 and the second stage rotor blades 223 are connected to each other via a first spool 225 that is driven by the first stage rotor blades 221 and the second stage rotor blades 223 to rotate in the first direction around the longitudinal centerline 12. The first spool 225 may be coupled to a gearbox 260 as shown in FIG. 1. Alternatively, as shown in FIG. 3, the first spool 225 may be coupled to the first shaft 317 to rotate (and power) the compressor 308. If more than two stages of rotor blades are disposed upstream of the final stage rotor blades 241, the additional stage(s) of rotor blades are also connected to the first stage rotor blades 221 and the second stage rotor blades 223 via the first spool 225.

The final stage rotor blades 241 are connected to a second spool 245 and rotate in a second direction around the longitudinal centerline 12, which is opposite the first direction. The final stage rotor blades 241 are connected to the second spool 245 that is driven by the final stage rotor blades 241 to rotate in the second direction. The second spool 245 may also be coupled to the gearbox 260 as shown in FIG. 1. Alternatively, as shown in FIG. 3, the second spool 245 may be coupled to the second shaft 319 for generation of electrical power via the generator 342.

As shown in FIG. 3, the final stage rotor blades 241 have a significantly greater height in the radial direction R than the first stage rotor blades 221 and the second stage rotor blades 223. The final stage rotor blades 241 also have a significantly greater height in the radial direction R than final stage rotor blades of conventional high speed low pressure turbines that rotate at the same speed in the same direction as the preceding stages of rotor blades. This greater height is possible due to the reduced speed of the final stage rotor blades 241 rotating in the second direction, as the reduced speed reduces the stresses experienced by the final stage rotor blades 241 compared to the aforementioned final stage rotor blades of conventional high speed low pressure turbines. Furthermore, the reduction in stresses experienced by the final stage rotor blades 241 may also enable materials that could not withstand the greater stresses experienced by the final stage rotor blades of conventional high speed low pressure turbines. According to one or more embodiments, the first stage rotor blades 221, the second stage rotor blades 223, and the final stage rotor blades 241 are formed of nickel alloys, or are formed of a material that comprises nickel alloys. According to one or more embodiments, the final stage rotor blades 241 are formed of a different material from the first stage rotor blades 221 and the second stage rotor blades 223. According to one or more embodiments, the final stage rotor blades 241 are formed of titanium aluminide or a material comprising titanium aluminide. As titanium aluminide is lighter than nickel alloys, forming the final stage rotor blades 241 of titanium aluminide instead of nickel alloys, enabled by the lower speed of the final stage rotor blades 241, results in significant weight savings that in turn enables a more efficient gas turbine engine 10.

According to one or more embodiments, the lower speed of rotation of the final stage rotor blades 241 also reduces a Mach number of the combustion gases exiting the turbine 310 and entering the exhaust section 32. For example, combustion gases may exit conventional high speed low pressure turbines and enter the exhaust section at a Mach number equal to around ½ Ma. According to one or more embodiments, the turbine 310 is structured such that combustion gases exit the turbine 310 and enter the exhaust section 32 at a Mach number of ⅓ Ma or lower. With a Mach number of ⅓ Ma or less, a frame-integrated heat exchanger that is integrated into the frame of the turbomachine 16 may be employed as the heat exchanger 350 in the exhaust section 32. According to one or more embodiments, the turbine 310 is structured such that combustion gases exit the turbine 310 and enter the exhaust section 32 at a Mach number of ¼ Ma or less. With a Mach number of a ¼ Ma or lower, a traditional heat exchanger separate from the frame of the turbomachine 16 may be employed as the heat exchanger 350 in the exhaust section 32.

Additionally, due to the counter-rotation between the final stage rotor blades 241 and the stage of the rotor blades immediately upstream of the final stage rotor blades 241, no guide vane is required therebetween. Thus, compared to a conventional high speed turbines in which the final stage rotor blades rotate in the same direction as the other stages of rotor blades, a guide vane can be removed, such that a more axially compact turbine 310 may be formed. Additionally, the more axially compact turbine 310 may in turn create more space in the axial direction A for the heat exchanger 350. A larger heat exchanger 350 extracts more heat from the exhaust section 32.

FIGS. 4 through 8 each illustrate a schematic view of various embodiments of a gas turbine engine 300, which may be utilized in an aircraft for generating thrust. The exemplary gas turbine engine 300 depicted in FIGS. 4 through 8 may each be configured in substantially the same manner as exemplary gas turbine engine 10 described above with reference to FIG. 1. The gas turbine engine 300 may define a longitudinal centerline 12. Additionally, the gas turbine engine 300 may define a cylindrical coordinate system having an axial direction A that extends along the longitudinal centerline 12, a radial direction R that extends orthogonally to the longitudinal centerline 12, and a circumferential direction C that extends around the longitudinal centerline 12.

The gas turbine engine 300 may generally include a compressor section 302, a combustion section 303, a turbine section 304, and an exhaust section 305 arranged in a serial flow order. In some embodiments, the compressor section 302 may include a compressor 308, and the turbine section 304 may include a turbine 310. For example, in some embodiments, the compressor section 302 may include a low pressure compressor and a high pressure compressor (such as the LP compressor 22 and the HP compressor 24 shown in FIG. 1). Similarly, in such embodiments, the turbine section 304 may include a LP turbine and an HP turbine (such as the LP turbine 30 and the HP turbine 28 shown in FIG. 1).

In exemplary embodiments, the compressor section 302, the combustion section 303, the turbine section 304, and the exhaust section 305 may define (e.g., collectively define) a core flowpath 37. The majority of the air may move through the core flowpath 37, e.g., the air may be received and compressed by the compressor section 302, utilized in the combustion section 303, expanded through the turbine section 304, and exhausted out the exhaust section 305.

Figure 4:
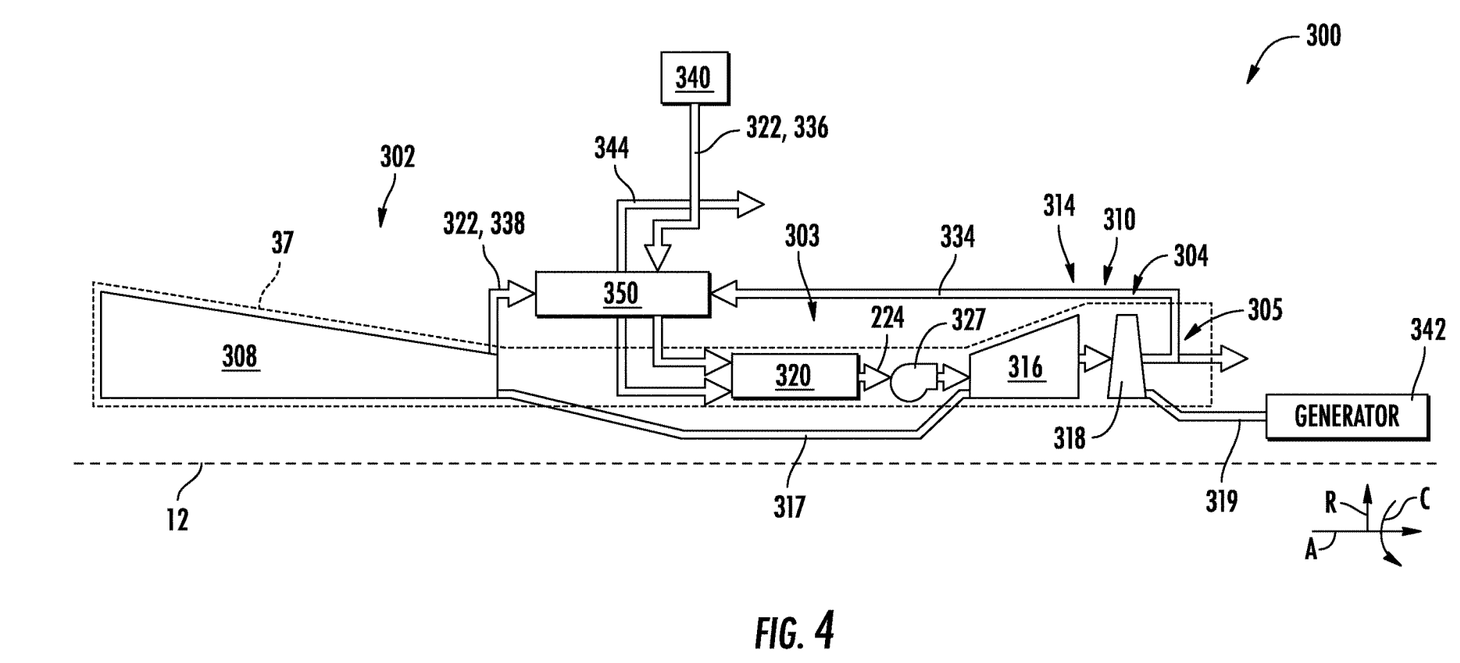
FIG. 4 is simplified schematic view of a gas turbine engine in accordance with an embodiment of the present disclosure.
Figure 5:
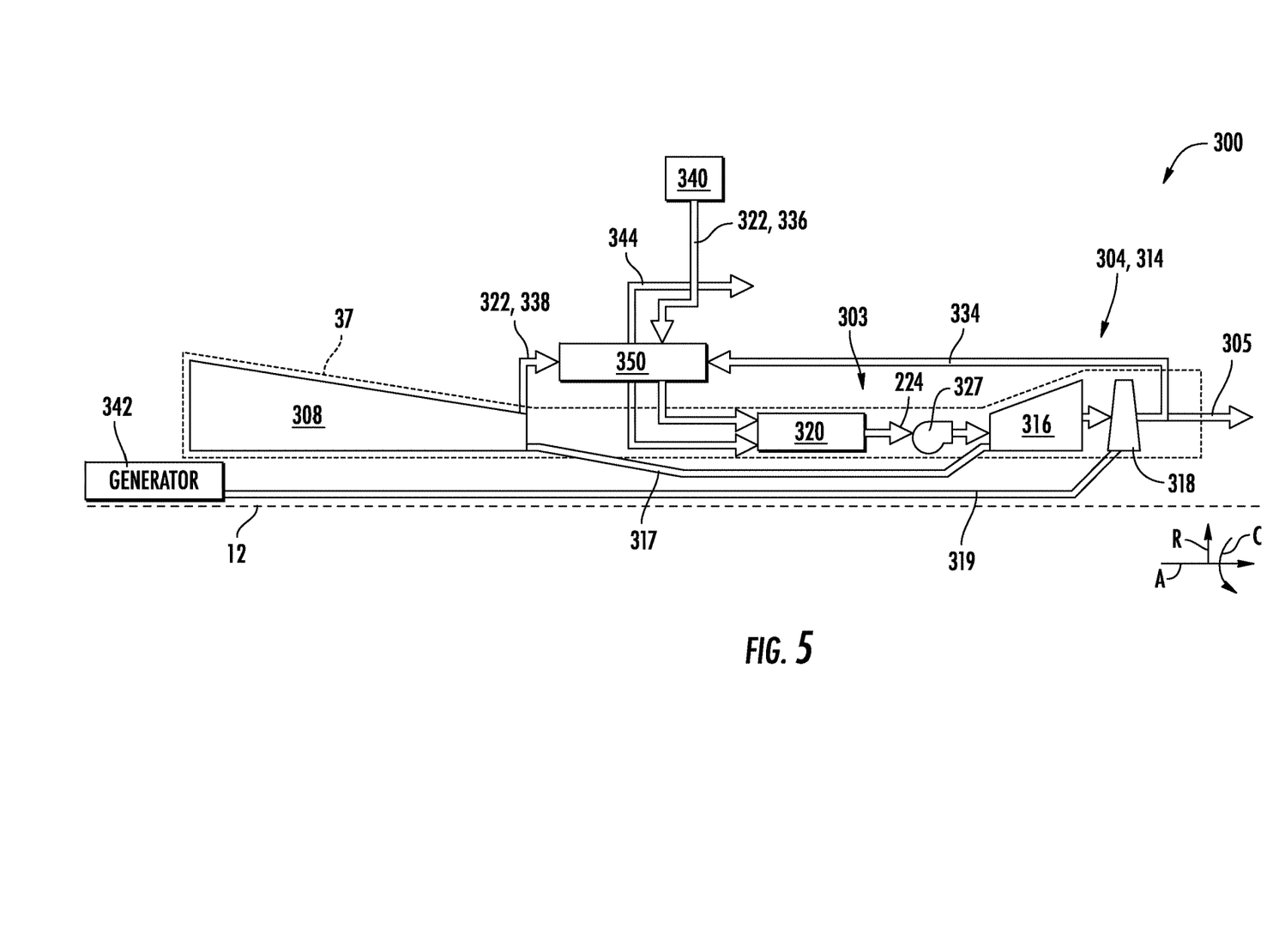
FIG. 5 is simplified schematic view of a gas turbine engine in accordance with an embodiment of the present disclosure.
Figure 6:
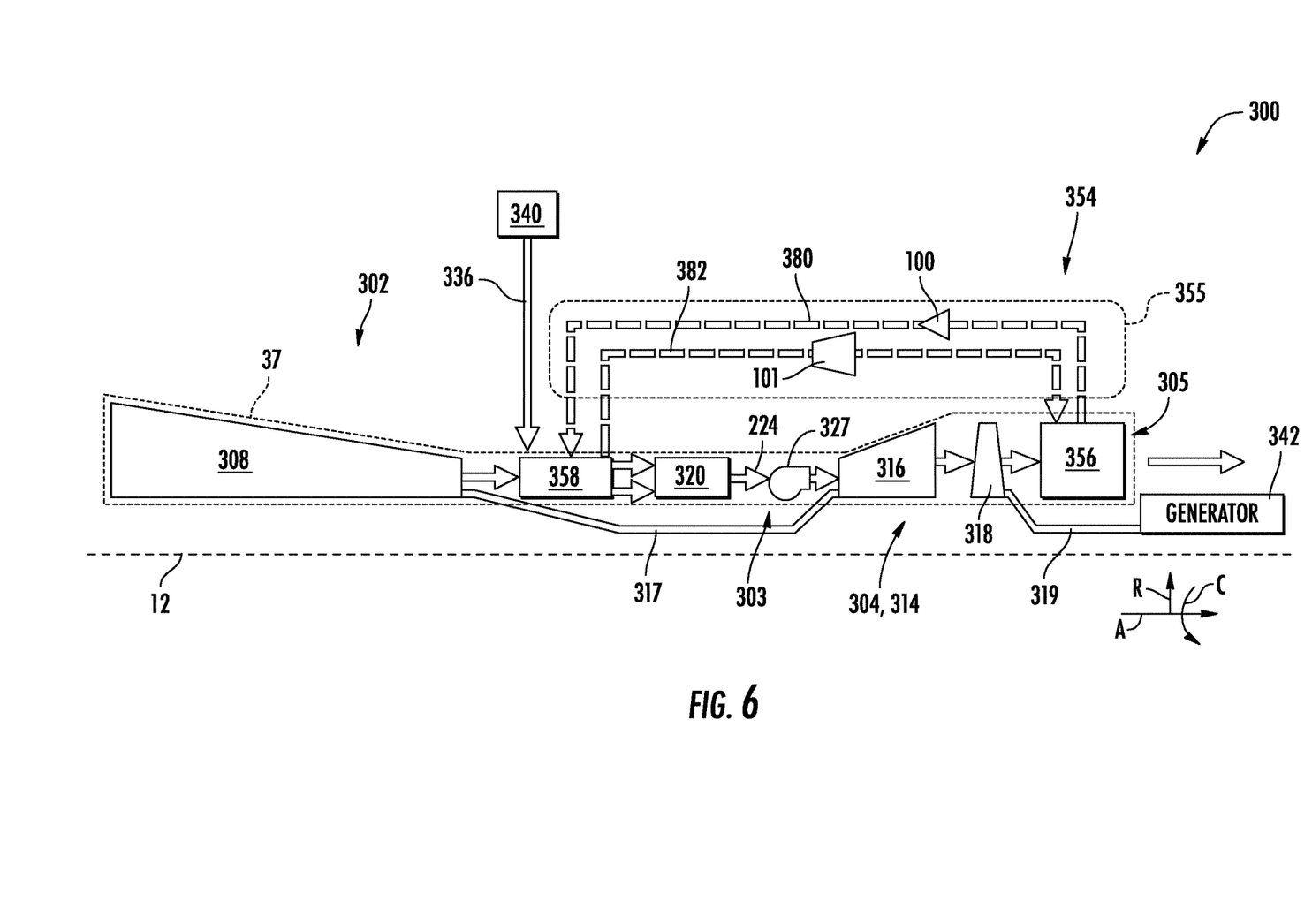
FIG. 6 is simplified schematic view of a gas turbine engine in accordance with an embodiment of the present disclosure.

In many embodiments, the gas turbine engine 300 may further include a fuel cell assembly 320 fluidly coupled to one or more fluid supply lines 322 for receiving one or more input fluids. As shown in FIGS. 4 through 6, the fuel cell assembly 320 may be included in the combustion section 303 and may provide output products 224 to a combustor 327 of the combustion section 303. The combustor 327 may ignite the output products 224 and provide the combustion gases to the turbine section 304 for expansion in the turbine 310. Alternatively, as shown in FIG. 2, the fuel cell assembly 320 may provide one or more output products 224 directly to the turbine 310 of the turbine section 304. Additionally, as shown in FIGS. 4 through 6, the fuel cell assembly 320 may be disposed in the core flowpath 37, such that the fuel cell assembly 320 may be supplied with air from the compressor 308 in the core flowpath 37 or cooled by the air flowing thereover in the core flowpath 37. In many embodiments, the fluid supply lines 322 may include a fuel supply line 336 and an air supply line 338. The fuel supply line 336 may extend from a fuel supply 340 to the fuel cell assembly 320. The fuel supply 340 may be a container, tank, or other supply of fuel. The fuel supply line 336 may provide a fuel to the fuel cell assembly 320, e.g., the fuel may be provided to the anode side of the fuel cell assembly 320. The air supply line 338 may extend from the compressor 308 of the compressor section 302 to the fuel cell assembly 320. The air supply line 338 may be a bleed air line from the compressor 308, such that the air supply line 338 provides a portion of compressed air from the compressor 308 to the fuel cell assembly 320. In many embodiments, air may be provided to the cathode side of the fuel cell assembly 320.

As shown in FIGS. 4 and 5, the gas turbine engine 300 may include a heat exchanger 350 that receives exhaust gases from downstream of the counter rotating stages 314 of turbine blades. That is, the exhaust gases received by the heat exchanger 350 may come from the turbine 310 downstream of the counter rotating stages 314. For example, the heat exchanger 350 may be in fluid communication with the exhaust section 305 via an exhaust collection duct 334. For example, the exhaust collection duct 334 may extend from the exhaust section 305 to the heat exchanger 350. Particularly, the exhaust collection duct 334 may extend from the exhaust section 305 downstream of the second-direction turbine stage 318 to the heat exchanger 350, such that the exhaust collection duct 334 receives exhaust gases from downstream of the counter rotating stages 314. Pulling exhaust gases from downstream of the second-direction turbine stage 318 is advantageous because the exhaust gases in this location have a reduced Mach number from having passes through the counter rotating stages 314, and as such, the exhaust gases may be used in the heat exchanger 350.

The heat exchanger 350 may thermally couple the air supply line 338, the fuel supply line 336, with the exhaust gases downstream of the counter-rotating stages 314. In many embodiments, as shown in FIGS. 4 and 5, the heat exchanger 350 may be disposed outside of the core flowpath 37. Additionally, the heat exchanger 350 may be disposed upstream (or axially inward) of the fuel cell assembly 320 with respect to the direction of air through the core flowpath 37. Particularly, the heat exchanger 350 may be disposed upstream of the fuel cell assembly 320 and downstream of the compressor 308.

In exemplary embodiments, as shown in FIGS. 4 through 7, the turbine 310 may include turbine blades arranged in counter rotating stages 314. For example, the counter rotating stages 314 may include a first-direction turbine stage 316 that rotates in a first direction at a first speed. Additionally, the counter rotating stages 314 may include a second-direction turbine stage 318 positioned downstream of the first-direction turbine stage 316 that rotates in a second direction opposite the first direction at a second speed.

Figure 7:
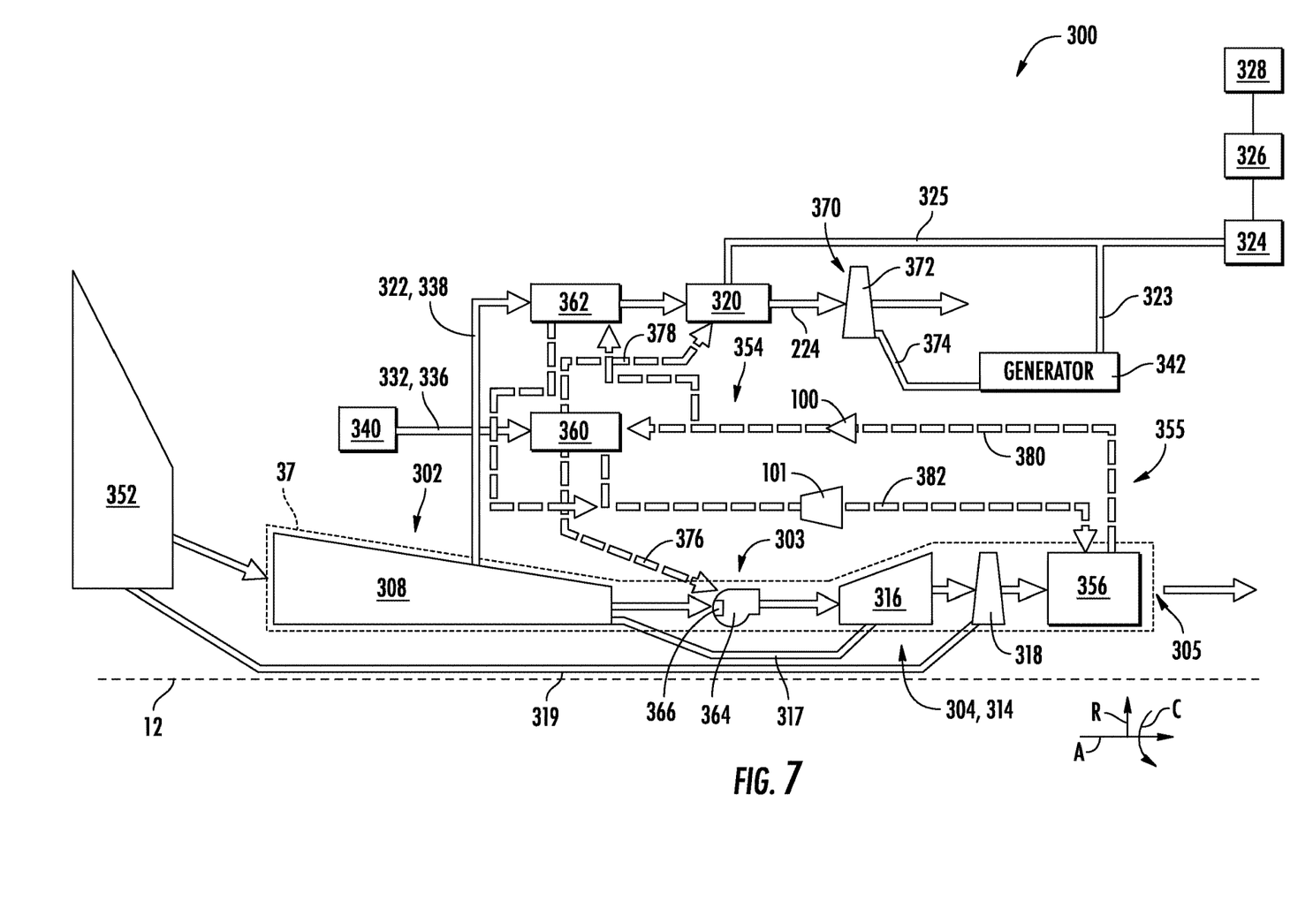
FIG. 7 is simplified schematic view of a gas turbine engine in accordance with an embodiment of the present disclosure.

As shown in FIGS. 4 through 7, the first-direction turbine stage 316 may be coupled to a first shaft or a high speed shaft 317, such that the first-direction turbine stage 316 and the first shaft 317 rotate together in the first direction. Similarly, the second-direction turbine stage 318 may be coupled to a second shaft or low speed shaft 319, such that the second-direction turbine stage 318 and the second shaft 319 rotate together in the second direction. The first shaft 317 and the second shaft 319 are not coupled to one another. In various embodiments, as shown in FIGS. 4 through 6, the second shaft 319 may be coupled to a generator 342, such that the generator 342 may convert the rotational energy of the second shaft 319 into electrical energy. In such embodiments, as shown in FIGS. 4 and 6, the generator 342 may be disposed downstream of the turbine section 304 and/or the exhaust section 305 with respect to the airflow direction through the core flowpath 37 (e.g., the generator 342 may be disposed on a hot-side of the gas turbine engine 300). In other embodiments, as shown in FIGS. 5, the generator 342 may be disposed upstream of the turbine section 304 and/or the combustion section 303 with respect to the airflow direction through the core flowpath 37 (e.g., the generator 342 may be disposed on a cold-side of the gas turbine engine 300). Alternatively, or additionally, as shown in FIG. 7, the second shaft 319 may be coupled to a booster fan 352, which may have a construction similar to the fan 38 described above with reference to FIG. 1. In many embodiments, the compressor 308 may be coupled to the high speed shaft 317, such that the first-direction turbine stage 316 powers the compressor 308.

Figure 8:
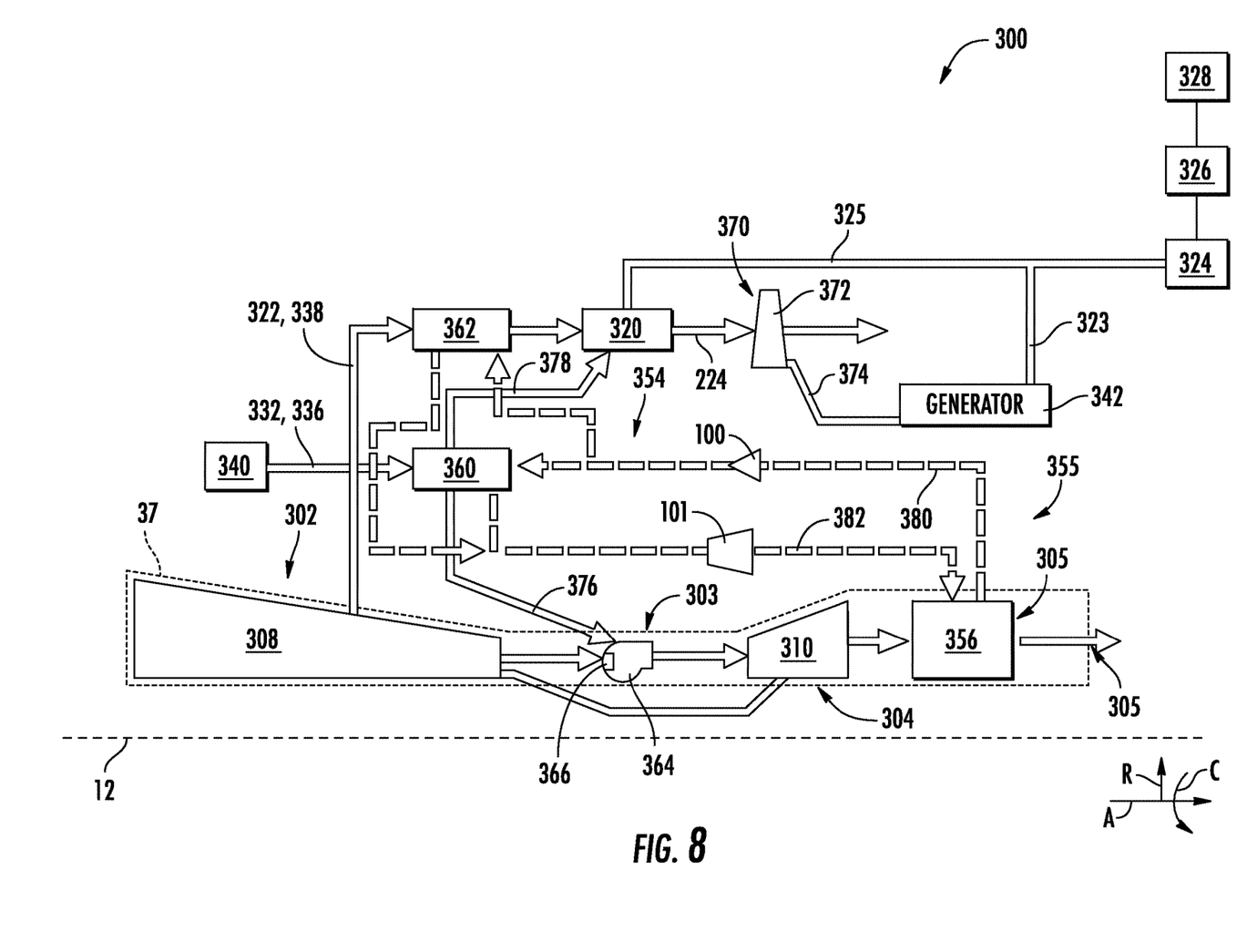
FIG. 8 is simplified schematic view of a gas turbine engine in accordance with an embodiment of the present disclosure.

In particular embodiments, as shown in FIGS. 6 through 8, the gas turbine engine 300 may further include a heat recovery system 354. The exemplary heat recovery system 354 is generally configured to extract heat from a heat source (e.g., a heat source not fully utilizing the heat being extracted therefrom) and transfer such extracted heat to a heat sink, such that the heat sink may more efficiently utilize such extracted heat.

The heat recovery system 354 generally includes a heat source exchanger 356 (i.e., a heat exchanger configured to extract heat for the heat recovery system 354 from a heat source of the gas turbine engine 10), a heat sink exchanger 358 (i.e., a heat exchanger configured to transfer heat from the heat recovery system 354 to a heat sink of the gas turbine engine 10), a thermal transfer bus 355, and a pump 100.

Each of these components is described in greater detail as follows. In some embodiments, as shown in FIG. 6, the heat recovery system 354 may include a single heat sink exchanger 358. In other embodiments, as shown in FIGS. 7 and 8, the heat recovery system 354 may include a first heat sink exchanger 360 and a second heat sink exchanger 362.

In many embodiments, the heat source exchanger 356 is in thermal communication with the exhaust section 305 of the gas turbine engine 10 such that the heat source exchanger 356 extracts heat from the exhaust section 305. The heat source exchanger 356 may be integrated into a strut extending through the exhaust section 305 or a liner defining at least in part the exhaust section 305, or alternatively may be positioned at any other suitable location in thermal communication with an airflow/gases through the exhaust section 305 of the gas turbine engine 10. In many embodiments, the heat source exchanger 356 may be disposed in the core flowpath 37.

The thermal transfer bus 355 may circulate a thermal fluid between the heat source exchanger 356 and the one or more heat sink exchangers. The thermal transfer bus 355 may include a supply line 380 and a return line 382. The supply line 380 may extend from the heat source exchanger 356 to the one or more heat sink exchangers, and the return line 382 may extend from the one or more heat sink exchangers to the heat source exchanger 356. While the supply line 380 and the return line 382 are depicted in phantom (i.e., dashed), it should be appreciated that the supply line 380 and the return line 382 are solid fluid conduits extending between one or more locations. The pump 100 may be disposed on the supply line 380. Additionally, an expansion device 101 (e.g., a turbine) may be disposed in fluid communication on the return line 382. For example, the expansion device 101 may be in fluid communication with the thermal transfer bus 355 downstream of the one or more heat sink exchangers and upstream of the heat source exchanger 356. With such an embodiment, the expansion device 101 may extract additional energy from the thermal transfer fluid, increasing the efficiency of the heat recovery system 354 and the gas turbine engine 300.

For example, the heat source exchanger 356 may be disposed in fluid communication on the thermal transfer bus 355 and positioned downstream of the counter rotating stages 314. Particularly, as shown in FIGS. 6 and 7, the heat source exchanger 356 may be disposed in the exhaust section 305 immediately downstream of the second-direction turbine stage 318, such that the heat source exchanger 356 extracts heat from the exhaust gases downstream of the second-direction turbine stage 318 (once the Mach number of the exhaust gases has dropped).

Referring specifically to FIG. 6, the heat sink exchanger 358 may be disposed in fluid communication on the thermal transfer bus 355 and positioned upstream of the fuel cell assembly 320. In such embodiments, the heat sink exchanger 358 may be thermally coupled to the one or more fluid supply lines 322 of the fuel cell assembly 320. For example, as shown in FIG. 6, the heat sink exchanger 358 may be disposed in the core flowpath 37 upstream of the fuel cell assembly 320 and downstream of an outlet to the compressor 308, such that all the air from the compressor 308 passes through the heat sink exchanger 358 prior to entrance into the fuel cell assembly 320. Additionally, the heat sink exchanger 358 may be disposed in thermal communication on the fuel supply line 336, in order to preheat fuel being supplied from the fuel supply 340 to the fuel cell assembly 320.

Referring now to FIGS. 7 and 8, the heat sink exchanger may be a first heat sink exchanger 360 and a second heat sink exchanger 362. In such embodiments, instead of a single heat sink exchanger being thermally coupled to both the fuel supply line 336 and the air supply line 338 (or the air in the core flowpath 37) as shown in FIGS. 4 through 6 and described above, the first heat sink exchanger 360 may thermally couple to the fuel supply line 336, and the second heat sink exchanger 362 may thermally couple to the air supply line 338.

For example, the first heat sink exchanger 360 may be disposed in fluid communication on the thermal transfer bus 355 and positioned in thermal communication on the fuel supply line 336. Similarly, the second heat sink exchanger 362 may be disposed in fluid communication on the thermal transfer bus 355 and positioned in thermal communication on the air supply line 338. Particularly, the first heat sink exchanger 360 and the second heat sink exchanger 362 may each be disposed outside of the core flowpath 37.

In exemplary implementations, the first heat sink exchanger 360 and the second heat sink exchanger 362 may separately thermally couple to the fuel supply line 336 and the air supply line 338, which advantageously allows for the first heat sink exchanger 360 and the second heat sink exchanger 362 to be differently sized. Additionally, the first heat sink exchanger 360 and the second heat sink exchanger 362 may be configured to transfer different amounts of heat to the respective lines to which the exchangers are coupled.

Additionally, as shown in FIGS. 7 and 8, the combustion section 303 may include a combustor 364 having a fuel nozzle 366 that may inject a mixture of fuel and air into a combustion chamber. The mixture of fuel and air may be combusted and the combustion gases may be provided to the turbine 310. As shown the fuel supply line 336 may include a first branch 376 and a second branch 378. The first branch 376 may extend between the first heat sink exchanger 360 and the combustor 364, and the second branch 378 may extend between the first heat sink exchanger 360 and the fuel cell assembly 320.

In such embodiments, as shown in FIGS. 7 and 8, the fuel cell assembly 320 may not be included in the combustion section 303 (i.e., the fuel cell assembly 320 may not be disposed in the core flowpath 37). Rather, the gas turbine engine 300 may include an auxiliary turbine 370 disposed outside of the core flowpath 37, and the fuel cell assembly 320 may power the auxiliary turbine 370. The auxiliary turbine 370 may include an auxiliary stage 372 (e.g., an auxiliary stage of turbine blades) coupled to the generator 342 via an auxiliary shaft 374. The auxiliary turbine 370 may be disposed radially outward of the turbine 310. Additionally, as shown in FIG. 8, the auxiliary turbine 370 may be generally axially aligned with the turbine 310 and may include a plurality of turbine blades. The plurality of turbine blades in the auxiliary turbine 370 may be smaller than the turbine blades in the turbine 310.

The auxiliary turbine 370 may be powered by the fuel cell assembly 320. For example, as shown in FIGS. 7 and 8, the fuel cell assembly 320 may be disposed forward of the auxiliary turbine 370 with respect to the axial direction A. Alternatively stated, the fuel cell assembly 320 may be disposed upstream of the auxiliary turbine 370. In this way, the auxiliary turbine 370 may receive the output products 224 of the fuel cell assembly 320, which may act as the working fluid to power the auxiliary turbine 370.

As shown in FIGS. 7 and 8, the fuel cell power output 325 and the generator power output 323 may be directed to a power converter 324 in order to change the DC current into DC current or AC current that can be effectively utilized by one or more subsystems. In particular, for the embodiment depicted, the electrical power is provided from the power converter 324 to an electric bus 326. The electric bus 326 may be an electric bus dedicated to the gas turbine engine 300, an electric bus of an aircraft incorporating the gas turbine engine 300, or a combination thereof. The electric bus 326 is in electric communication with one or more additional electrical devices 328, which may be a power source, a power sink, or both. For example, the additional electrical devices 328 may be a power storage device (such as one or more batteries), an electric machine (an electric generator, an electric motor, or both), an electric propulsion device, etc.

As shown in FIG. 7, the first shaft 317 may be coupled to the compressor 308, and the second shaft 319 may be coupled to the booster fan 352, which may have a construction similar to the fan 38 described above with reference to FIG. 1. Alternatively, as shown in FIG. 8, the turbine 310 may not include counter rotating stages 314, such that a singular shaft couples the turbine 310 to the compressor 308. In such embodiments, the heat source exchanger 356 may be disposed downstream of the turbine 310.

Figure 9:
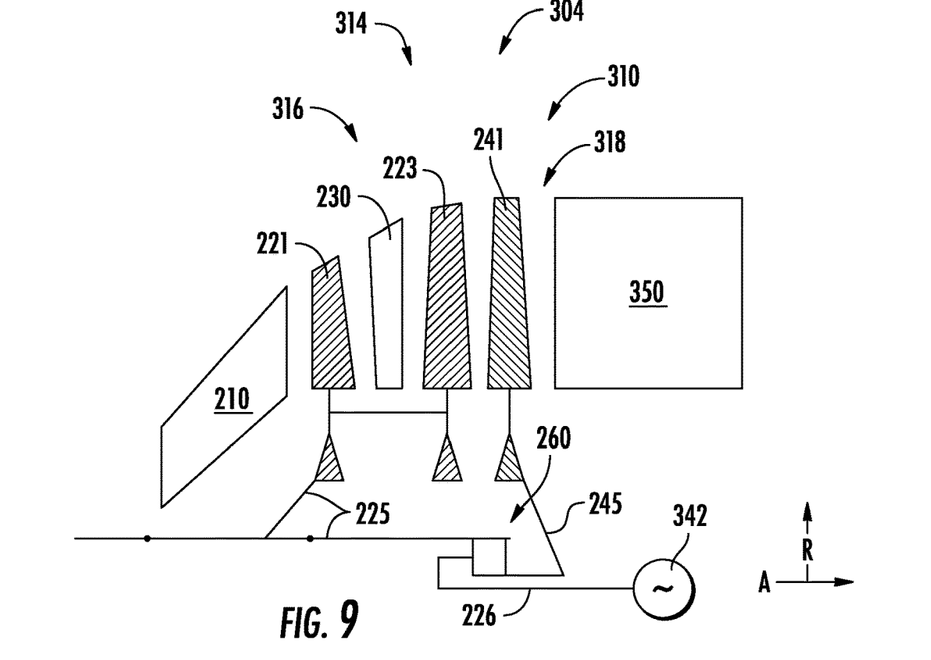
FIG. 9 is a schematic view of a portion of a turbine section of a gas turbine engine according to an exemplary aspect of the present disclosure.
Figure 10:
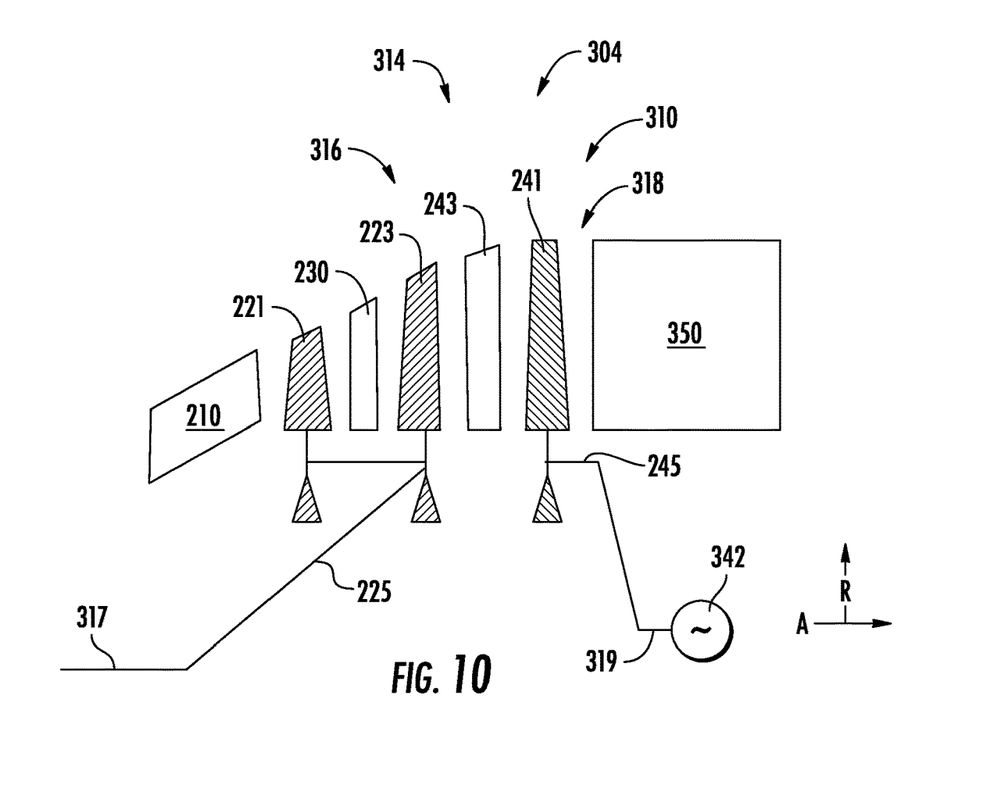
FIG. 10 is a schematic view of a portion of a turbine section of a gas turbine engine according to an exemplary aspect of the present disclosure.

FIGS. 9 and 10 each illustrate a schematic view of a portion of a turbine section 304 of a gas turbine engine according to one or more alternative embodiments of the present disclosure. The turbine section 304 may be incorporated into any of the gas turbine engines 300 described above with reference to FIGS. 2 and 4 through 8. More specifically, FIGS. 9 through 10 each illustrate various embodiments of a turbine 310 and a heat exchanger 350. In some embodiments, the heat exchanger 350 may be the heat source exchanger 356 described above.

The turbine 310 includes counter rotating stages 314, which include a first-direction turbine stage 316 and a second-direction turbine stage 318. The first-direction turbine stage 316 may include the first stage rotor blade 221 and the second stage rotor blades 223. The second-direction turbine stage 318 may include the final stage rotor blades 241. More particularly, the turbine 310 may include, in serial flow order and along the axial direction A, first turbine guide vanes 210, first stage rotor blades 221, second turbine guide vanes 230, second stage rotor blades 223, and final stage rotor blades 241. In some embodiments, as shown in FIG. 10, a third turbine guide vane 243 may be disposed axially between the second stage rotor blades 223 and the final stage rotor blades 241.

As shown in FIG. 9, the first-direction turbine stage 316 may be coupled to a gearbox 260 via a first spool 225, and the second-direction turbine stage 318 may be coupled to a gearbox 260 via a second spool 245. According to one or more embodiments, the gearbox 260 may be structured as a planetary gear system in which that the first spool 225 is fixed or connected to a ring gear, the second spool 245 is fixed or coupled to a sun gear, and a generator shaft 226 is fixed or coupled to the planet gears. In this way, the first spool 225 may rotate the fastest, the second spool 245 may rotate the slowest, and the generator shaft 226 may rotate at a speed between the first spool and the second spool. The generator shaft 226 may be coupled to the generator 342 to convert rotational energy into electrical energy. Alternatively, as shown in FIG. 10, first spool 225 may be coupled to the first shaft 317 in order to rotate (and power) the compressor 308, and the second spool 245 may be coupled to the second shaft 319 for generation of electrical power via the generator 342

Further aspects are provided by the subject matter of the following clauses:

An aircraft engine comprising: a compressor section comprising a compressor; a turbine section downstream of the compressor section, the turbine section including a turbine having turbine blades arranged in counter rotating stages; one or more fluid supply lines; a fuel cell assembly fluidly coupled to the one or more fluid supply lines for receiving one or more input fluids, the fuel cell assembly in fluid communication with the turbine section to provide one or more output products to the turbine section; and a heat exchanger in fluid communication with the turbine downstream of the counter rotating stages of turbine blades to receive exhaust gases from the turbine, the heat exchanger thermally coupled to the one or more fluid supply lines of the fuel cell assembly.

The aircraft engine of any preceding clause, wherein the one or more fluid supply lines comprise a fuel supply line and an air supply line, the fuel supply line configured to extend between a fuel supply and the fuel cell assembly, the air supply line extending between the compressor and the fuel cell assembly.

The aircraft engine of any preceding clause, wherein the heat exchanger thermally couples the fuel supply line and the air supply line to the exhaust gases.

The aircraft engine of any preceding clause, wherein the counter rotating stages comprise a first-direction turbine stage that rotates in a first direction at a first speed, and a second-direction turbine stage downstream of the first-direction turbine stage that rotate in a second direction opposite the first direction at a second speed, and wherein the second speed is lower than the first speed.

The aircraft engine as in one or more of these clauses, further comprising a first shaft coupling the first-direction turbine stage to the compressor.

The aircraft engine of any preceding clause, further comprising a second shaft coupling the second-direction turbine stage to a generator.

The aircraft engine of any preceding clause, further comprising a second shaft and a booster fan, the second shaft coupling the second-direction turbine stage to the booster fan.

The aircraft engine of any preceding clause, further comprising a first shaft, a second shaft, and a gearbox, wherein the first shaft couples the first-direction turbine stage to the gearbox, and wherein the second shaft couples the second-direction turbine stage to the gearbox.

The aircraft engine of any preceding clause, further comprising a combustion section and an exhaust section, wherein the compressor section, the combustion section, the turbine section, and the exhaust section define a core flowpath.

The aircraft engine of any preceding clause, wherein the heat exchanger is disposed in the core flowpath.

The aircraft engine of any preceding clause, wherein the heat exchanger is disposed outside of the core flowpath.

The aircraft engine of any preceding clause, further comprising a generator and an auxiliary turbine disposed radially outward of the turbine, the auxiliary turbine having an auxiliary stage of turbine blades coupled to the generator via an auxiliary shaft, and wherein the fuel cell assembly provides the one or more output products to the auxiliary turbine.

An aircraft engine comprising: a compressor section comprising a compressor; a turbine section downstream of the compressor section, the turbine section including a turbine having turbine blades arranged in counter rotating stages; and one or more fluid supply lines; a fuel cell assembly fluidly coupled to the one or more fluid supply lines for receiving one or more input fluids, wherein the fuel cell assembly is in fluid communication with the turbine section to provide one or more output products to one of the turbine section; and a heat recovery system comprising: a thermal transfer bus; a heat source exchanger disposed in fluid communication on the thermal transfer bus and positioned downstream of the counter rotating stages; and a heat sink exchanger disposed in fluid communication on the thermal transfer bus and positioned upstream of the fuel cell assembly, wherein the heat sink exchanger thermally coupled to the one or more fluid supply lines of the fuel cell assembly.

The aircraft engine of any preceding clause, the one or more fluid supply lines comprising a fuel supply line and an air supply line, the fuel supply line configured to extend between a fuel supply and the fuel cell assembly, the air supply line extending between the compressor section and the fuel cell assembly.

The aircraft engine of any preceding clause, wherein the heat sink exchanger is a first heat sink exchanger, and wherein the heat recovery system further comprises a second heat sink exchanger disposed in fluid communication on the thermal transfer bus.

The aircraft engine of any preceding clause, wherein the first heat sink exchanger is disposed in thermal communication on the air supply line, and wherein the second heat exchanger is disposed in thermal communication on the fuel supply line.

The aircraft engine of any preceding clause, further comprising a combustion section and an exhaust section, wherein the compressor section, the combustion section, the turbine section, and the exhaust section define a core flowpath, and wherein the heat source exchanger is disposed in the core flowpath.

The aircraft engine of any preceding clause, wherein the first heat sink exchanger and the second heat sink exchanger are disposed in the core flowpath.

The aircraft engine as in one or more of these clauses, wherein the first heat sink exchanger and the second heat sink exchanger are disposed outside the core flowpath.

The aircraft engine of any preceding clause, further comprising a generator and an auxiliary turbine disposed radially outward of the turbine, the auxiliary turbine having an auxiliary stage of turbine blades coupled to the generator via an auxiliary shaft, and wherein the fuel cell assembly provides the one or more output products to the auxiliary turbine.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:
1. An aircraft engine comprising:
  a compressor section comprising a compressor;
  a turbine section downstream of the compressor section, the turbine section including a turbine having turbine blades arranged in counter rotating stages, the turbine blades including one or more stages of first-direction turbine blades and a single stage of second-direction turbine blades located downstream of the first-direction turbine blades, wherein the single stage of second-direction turbine blades is directly downstream of the first-direction turbine blades and is the only stage of second direction turbine blades of the turbine, and wherein a first shaft couples the one or more stages of first-direction turbine blades to a gearbox and a second shaft couples the single stage of second-direction turbine blades to the gearbox;
one or more fluid supply lines;
a fuel cell assembly fluidly coupled to the one or more fluid supply lines for receiving one or more input fluids, the fuel cell assembly in fluid communication with the turbine section to provide one or more output products to the turbine section; and
a heat exchanger in fluid communication with the turbine downstream of the counter rotating stages of turbine blades to receive exhaust gases from the turbine, the heat exchanger thermally coupled to the one or more fluid supply lines of the fuel cell assembly.

2. The aircraft engine as in claim 1, wherein the one or more fluid supply lines comprise a fuel supply line and an air supply line in fluid communication with the heat exchanger, the fuel supply line extending between a fuel supply and the fuel cell assembly, the air supply line extending between the compressor and the fuel cell assembly.

3. The aircraft engine as in claim 2, wherein the heat exchanger thermally couples the fuel supply line and the air supply line to the exhaust gases.

4. The aircraft engine as in claim 1, wherein the one or more stages of first-direction turbine blades comprise a first-direction turbine stage that rotates in a first direction at a first speed, and the single stage of second-direction turbine blades rotates in a second direction opposite the first direction at a second speed, and wherein the second speed is lower than the first speed.

5. The aircraft engine as in claim 4, awherein the first shaft couples the first-direction turbine stage to the compressor.

6. The aircraft engine as in claim 5, further comprising a second shaft coupling the single stage of second-direction turbine blades to a generator.

7. The aircraft engine as in claim 5, further comprising a second shaft and a booster fan, the second shaft coupling the single stage of second-direction turbine blades to the booster fan.

8. The aircraft engine as in claim 1, further comprising a combustion section and an exhaust section, wherein the compressor section, the combustion section, the turbine section, and the exhaust section define a core flowpath.

9. The aircraft engine as in claim 8, wherein the heat exchanger is disposed in the core flowpath.

10. The aircraft engine as in claim 8, wherein the heat exchanger is disposed outside of the core flowpath.

11. The aircraft engine as in claim 1, further comprising a generator and an auxiliary turbine disposed radially outward of the turbine, the auxiliary turbine having an auxiliary stage of turbine blades coupled to the generator via an auxiliary shaft, and wherein the fuel cell assembly provides the one or more output products to the auxiliary turbine.

12. The aircraft engine as in claim 1, wherein the gearbox is mechanically coupled to the compressor section.

13. An aircraft engine comprising:
a compressor section comprising a compressor;
a turbine section downstream of the compressor section, the turbine section including a turbine having turbine blades arranged in counter rotating stages, the turbine blades including one or more stages of first-direction turbine blades and a single stage of second-direction turbine blades located downstream of the first-direction turbine blades, wherein the single stage of second-direction turbine blades is directly downstream of the first-direction turbine blades and is the only stage of second direction turbine blades of the turbine, and wherein a first shaft couples the one or more stages of first-direction turbine blades to a gearbox and a second shaft couples the single stage of second-direction turbine blades to the gearbox; and
one or more fluid supply lines;
a fuel cell assembly fluidly coupled to the one or more fluid supply lines for receiving one or more input fluids, wherein the fuel cell assembly is in fluid communication with the turbine section to provide one or more output products to one of the turbine section; and
a heat recovery system comprising:
a thermal transfer bus;
a heat source exchanger disposed in fluid communication on the thermal transfer bus and positioned downstream of the counter rotating stages; and
a heat sink exchanger disposed in fluid communication on the thermal transfer bus and positioned upstream of the fuel cell assembly, wherein the heat sink exchanger is thermally coupled to the one or more fluid supply lines of the fuel cell assembly.

14. The aircraft engine as in claim 13, the one or more fluid supply lines comprising a fuel supply line and an air supply line, the fuel supply line configured to extend between a fuel supply and the fuel cell assembly, the air supply line extending between the compressor section and the fuel cell assembly.

15. The aircraft engine as in claim 14, wherein the heat sink exchanger is a first heat sink exchanger, and wherein the heat recovery system further comprises a second heat sink exchanger disposed in fluid communication on the thermal transfer bus.

16. The aircraft engine as in claim 15, wherein the first heat sink exchanger is disposed in thermal communication on the air supply line, and wherein the second heat sink exchanger is disposed in thermal communication on the fuel supply line.

17. The aircraft engine as in claim 16, further comprising a combustion section and an exhaust section, wherein the compressor section, the combustion section, the turbine section, and the exhaust section define a core flowpath, and wherein the heat source exchanger is disposed in the core flowpath.

18. The aircraft engine as in claim 17, wherein the first heat sink exchanger and the second heat sink exchanger are disposed in the core flowpath.

19. The aircraft engine as in claim 17, wherein the first heat sink exchanger and the second heat sink exchanger are disposed outside the core flowpath.

20. The aircraft engine as in claim 13, further comprising a generator and an auxiliary turbine disposed radially outward of the turbine, the auxiliary turbine having an auxiliary stage of turbine blades coupled to the generator via an auxiliary shaft, and wherein the fuel cell assembly provides the one or more output products to the auxiliary turbine.

* * * * *